TIME-SLOT INTERCHANGE CIRCUIT

Filed March 13, 1961

INVENTOR.
K. Muroga &
N. Shimasaki
BY
Greene, Pineles & Durr
ATTORNEYS

United States Patent Office 3,217,106

Patented Nov. 9, 1965

3,217,106

TIME-SLOT INTERCHANGE CIRCUIT

Ko Muroga and Nobuhiko Shimasaki, Tokyo, Japan, assignors to Nippon Electric Company Limited, Tokyo, Japan Filed Mar. 13, 1961, Ser. No. 95,349
Claims priority, application Japan, Mar. 14, 1960, 35/8,570
9 Claims. (Cl. 179—15)

This invention relates generally to multiplexed communication systems, and more particularly to novel systems and circuits for effecting synchronous time division and redistribution in a plurality of channels.

In a synchronous time division multiplex communication system carrying $n$ channels, all the signals are sampled in a constant period T in which $n$ sampling pulses $P_1$, $P_2$ . . . $P_n$ are assigned. These pulses are used to modulate or demodulate the $n$ different signals to or from any of several known types of modulation. Such modulation forms are, PAM (pulse amplitude modulation); PWM (pulse width modulation); and PCM (pulse code modulation). The relative position of sampling pulses is referred to as their "time slot" hereinafter.

In ordinary time division multiplex transmission systems, the terminal equipment for each channel is assigned to a fixed time slot, by which the signals are transmitted and received between corresponding terminal units. In time division switching systems, particularly time division telephone exchange systems, however, each subscriber may not be assigned to a fixed time slot, but rather be assigned to any idle time slot selected by a master control circuit.

If we consider a communication system in which the transmission systems and the time-division switching sections that use the same type of modulation method, work together, it is desirable to use the selected modulated signal throughout the system. In this way it is unnecessary to demodulate the signals for transmitting or switching the signals within the communication sections or channels. Cumulative distortion caused by the modulation - demodulation repetition, is thus avoided. To do this, however, there must be means to shift the time slot; otherwise the problem of the channel blocking becomes serious. In accordance with the present invention, circuit means are provided, using multiple delay sections to synchronously arrange the output time slots for a plurality of channels, while retaining their modulated wave-forms.

It is among the objects of the present invention to provide novel multiple-channel communication systems with synchronous time division and redistribution.

Another object of the present invention is to provide novel multiplexed communication systems with minimum distortion of the channel modulated wave-forms.

A further object of the present invention is to provide novel plural channel time slot switching circuits with multiple delay sections.

The foregoing and other objects of the invention will be best understood from the following description of exemplifications thereof, reference being had to the accompanying drawings, wherein.

Figures 1, 2:
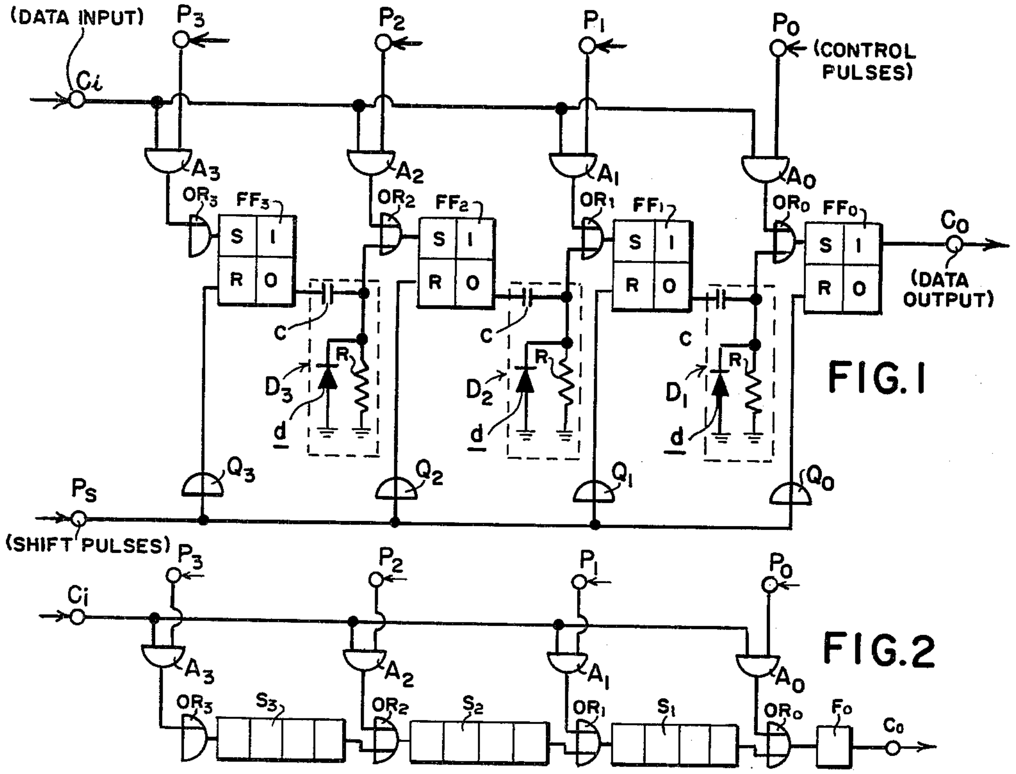
FIG. 1 is a schematic circuit diagram of a time slot shifting arrangement incorporating time delay sections, in accordance with the present invention.
FIG. 2 is a modified circuit embodying shift register delay units.

The FIG. 1 schematic circuit diagram is of an exemplary time slot shifter for a PCM system of four channels, each with one bit of information. Flip-Flops $FF_0$, $FF_1$, $FF_2$ and $FF_3$ are bistable multivibrators. In each flip-flop (FF) portion S is the "Set," and portion R, the "Reset" input terminals; with portions "1" and "0" in each flip-flop being the output terminals. Terminals "1" and "0" become "high," voltagewise, when either the S or R terminal has been energized, respectively. Gates $OR_0$, $OR_1$, $OR_2$ and $OR_3$ are logical "OR" gates. Gates $A_0$, $A_1$, $A_2$ and $A_3$ are logical "AND" gates. Gates $Q_0$, $Q_1$, $Q_2$ and $Q_3$ are mutual decoupling gates for the reset terminal $s$R of the flip-flop group. The gates, shown schematically, and the flip-flop (FF) units, are circuit components well known in the electronic and computer arts.

Delay networks $D_1$, $D_2$ and $D_3$, respectively, couple the output "0" terminals of corresponding flip-flops $FF_1$, $FF_2$, $FF_3$ to the preceding "OR" gates $OR_0$, $OR_1$ and $OR_2$. Networks $D_1$, $D_2$, $D_3$ are coupling circuits which respond only to a positive-going pulse. For simplicity, the delay caused by the "AND" gates A, the OR gates, the FF's, and the Q-gates may be considered negligible. However, the delay caused by the D-networks is significant. Networks $D_1$, $D_2$, $D_3$ may take desired forms, the illustrated ones each comprising a coupling condenser C, shunt resistor R, and shunt diode $d$. Their function is to impart a predetermined time delay between the circuit sections they respectively couple. Terminals $C_i$ and $C_o$ are, respectively, the input and output terminals of the time slot shifter of FIG. 1. The input terminal $P_s$ connects from the shift pulse which is continuously applied, with opposite phase to that of the input at $C_i$. Terminals $P_0$, $P_1$, $P_2$ and $P_3$ are the control terminals, arranged to open the four "AND" gates one at a time.

The circuit of FIG. 1 is a form of shift register, equipped with multi-input terminals. If we consider the case where only "AND" gate $A_3$ is open, the input information $C_i$ enters flip-flop $FF_3$, and is shifted at each shift pulse into terminal $P_s$ to $FF_2$, then $FF_1$, and finally $FF_0$. Thus, after the delay of three time-slot periods, the information is sent out at terminal $C_o$. An important feature of the invention is that the order of the input channel sequence is changed by appropriate sequencing of the control pulses into terminals $P_0$, $P_1$, $P_2$ and $P_3$.

*Table 1*

| | IV | III | II | I |
|---|---|---|---|---|
| Input | *d* | *c* | *b* | *a* |
| Output | *b* | *a* | *c* | *d* |

Table 1 is an example of a requirement to change the order of the input $C_i$ channel sequence to another given order at the output terminal $C_o$. Here, $a$, $b$, $c$ and $d$ represent the communication channels. The symbols I, II, III and IV represent the time slots. Table I shows, for example, that channel *a* of time slot I at the input terminal $C_i$, should be shifted to time slot III at the output $C_o$. To satisfy this requirement, the "AND" gate sequence to open at each time slot is: $A_2$ at I, again $A_2$ at II, $A_3$ at III, and $A_1$ at IV. The result, that is, the content of each flip-flop FF, is shown in Table 2 below. The circled symbols show that they entered into the flip-flops directly from input terminal $C_i$ through one of the "AND" gates. The uncircled symbols show that they are shifted from the previous flip-flop by a shift pulse at $P_s$. The content of $FF_0$, which in turn becomes the output $C_o$, is thus seen to clearly satisfy the sequence designated in Table 1.

*Table 2*

| | $F_3$ | $F_2$ | $F_1$ | $F_0$ |
|---|---|---|---|---|
| I | ---- | Ⓐ | c | d |
| II | ---- | Ⓑ | a | c |
| III | Ⓒ | ---- | b | a |
| IV | ---- | c | Ⓓ | b |

The rule herein of switching the "AND" gates A is to open, say, gate $A_k$, having the relation:

$$k=j-i(j\geqq i)$$
$$k=s+j+i(j<i)$$

where *i* is the time slot number (I, II, III or IV) of the input, *j* is that of the output, and *s* is the total number of the time slots.

Switching the "AND" gates according to such rule, results in neither superposition nor vacancy of the signal at the output $C_o$. This is shown, generally, in the following. The matrix, $$A=(a_{ij})=\begin{pmatrix} a_{11}a_{12}a_{13}\cdots\cdots a_{1s} \\ a_{21}a_{22}\cdots\cdots\cdots\cdots \vdots \\ \vdots \quad \vdots \\ a_{s1} \quad \cdots\cdots\cdots\cdots a_{ss} \end{pmatrix} \quad (1)$$

is considered, where $$a_{ij}=1 \text{ or } 0 \quad (2)$$

$$\sum_{i=1}^{s} a_{ij}=1 \quad (3)$$

$$\sum_{i=1}^{s} a_{ij}=1 \quad (4)$$

with *i* as the time slot number of the input signal, and *j* as the time slot number of the output signals, and $a_{ij}=1$ showing that the *i*th time slot at the input $C_i$ should be shifted to the *j*th time slot at the output $C_o$. Where $i=j$, $a_{ij}=1$, the time slots at both the input and the output terminals are the same, and the corresponding relation of shift of the time slot may be described by the above matrix (1).

The restriction of Equations 3 and 4 result from the stated 1:1 correspondence. For example, writing the contents of Table 1 in the same form as Equation 1, then, since this is the case of (S)=4, we derive:

| | I | II | III | IV |
|---|---|---|---|---|
| $a_{ij}$=I | 0 | 0 | 1 | 0 |
| II | 0 | 0 | 0 | 1 |
| III | 0 | 1 | 0 | 0 |
| IV | 1 | 0 | 0 | 0 |

(5)

showing the time position by the time slot number *i* of the input signal $C_i$, and considering the case that the input signal appears at arbitrary *i*, the data of Table 3 is obtained.

*Table 3*

| | Formula 1 | Formula 2 | |
|---|---|---|---|
| 1 | $a_{ij}=1$ | $j-1=0$ | Condition of the input and output having the same time slot at this position. |
| 2 | $a_{i-1,j-1}=1$ | $(j-1)-(i-1)=1$ | Condition of the input of a preceding time position becoming the output delayed by one time slot. |
| 3 | $a_{i-2,j-2}=2$ | $(j-2)-(i-2)=2$ | Condition of the input of the preceding time positions becoming the output delayed by two time slots. |
| ⋮ | ⋮ | ⋮ | |
| S | $a_{j-\overline{s-1},j-\overline{s-1}}=1$ | $(j-\overline{s-1})-(1-\overline{s-1})=s-1$ | Condition of the input of preceding (s−1) time positions becoming the output delayed by (s−1) time slots. |

When the term *a* is negative, *s* is added to the negative term; and it is considered as a reiteration of the time slot order sequence.

If the result does not satisfy Formula 4, it may result in either a superposition of the input signal at one time slot, or a vacancy of the signal at one time slot. But in this case, eliminating *j* in the left side of Formula 1 by using Formula 2 shown in Table 3, and summing these up, there is obtained:

$$a_{ij}+a_{i-1,\,j-1}+a_{i-2,\,j-2}+\;\cdots\;+a_{i-\overline{s-1},\,j-\overline{s-1}}$$
$$=a_{ii}+a_{i-1,\,i}+a_{i-2,\,1}\;\cdots\;+a_{i-s-1,\,i}=1 \quad (6)$$

As all the second terms are *i* in Equation 6, the first terms include the signs 1 to S, as *s* may be incorporated with *a*, when the first term is negative, and Equation 2 is applicable. This means that only one condition of the cases 1, 2, . . . S shown in Table 3, is realized. This proves that an input signal $C_i$ of more than two may not be superposed in one time slot, or that the time slot at the output $C_o$ does not become vacant. Therefore, if the matrix (1) is determined, satisfying the conditions of Equations 2, 3 and 4, any combination of time slots at the input may be converted to any other time slot sequence, as set forth.

Gate switching control signals at $P_0$, $P_1$, $P_2$ . . . are under the control of a suitable time slot memory circuit. The signals to open the gates are applied for each fixed time slot. There are many ways to provide such memory. For example, one way is in the form of an address, for the gates to open at every time slot; or storing the time slot data concerning each "AND" gate A, as required. It is to be noted, however, that such operation is similar to the usual operation in the time division switching systems, and is suitable for trunk circuits in the system.

In the system of FIG. 1, the modulation used is the PCM type, with one bit. However, when the number of bits in each signal is increased, output flip-flop $FF_0$ may be replaced by one-input-type shift register having the same number of stages as the number of bits.

Figure 3:
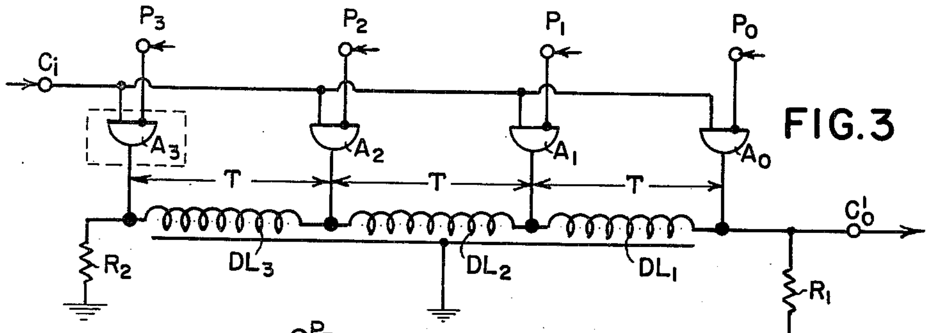
FIG. 3 is a further form of the present invention, with FIG. 3–A illustrating an AND gate thereof.
Figure 3A:
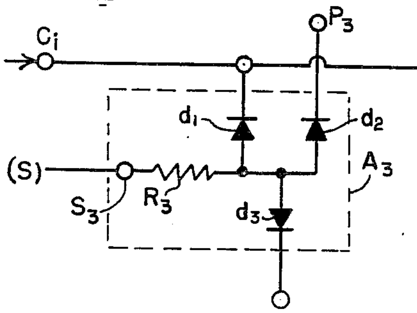

FIG. 2 is a modified form using words of four bits in each signal. Four-bit shift registers $S_1$, $S_2$ and $S_3$ are indicated schematically. The shift registers $S_1$, $S_2$ and $S_3$ are, respectively, coupled between the "OR" gates. The components remaining are the same as those of FIG. 1, and are similarly identified. The shift pulse section is omitted, but it is understood to function as in the system of FIG. 1. The shift registers $S_1$, $S_2$ and $S_3$ replace the corresponding flip-flops (FF) and associated time delay networks D. The shift registers $S_1$, $S_2$ and $S_3$ are indicated with four sections, corresponding to the four-bit words of the signals. Other shift stages are used for larger words. It is unnecessary to replace the output flip-flop by a shift resistor (as $S_o$). The flip-flops work merely as a reshaping circuit, and not as a delay element. Only the flip-flops $FF_1$, $FF_2$ and $FF_3$ (FIG. 1) and shift registers $S_1$, $S_2$, $S_3$ (FIG. 2) are time delay circuits which are significant in the functioning, as described. FIG. 3 schematically illustrates an application to the analog-type PM system in which quantities of pulse height, pulse width and time delay are of interest. The delay lines $DL_1$, $DL_2$ and $DL_3$ connect successively between the "AND" gates A. The DL lines each have uniformly distributed parameters, with a grounded capacitative plate coupled to a coil, with a time delay of T seconds. End terminal resistors $R_1$ and $R_2$ shunt to ground. Assuming that the time slot occupies $t$ seconds, the number of time division channels is $s$, the input P terminals to be controlled each at an equivalent length of T seconds in the delay circuit of $T(s-1)$, and the "AND" gates A to be connected with $s$ input terminals including both terminals, the output is obtained at the end of terminal $C_o$ of the delay circuitry.

The circuits of FIGS. 1 and 2 are digital circuits, applicable in PCM multiplex systems. This method, furthermore, is applicable at the transmission end, using analogous modulation like PAM and PWM, if the shift registers S are replaced by ordinary delay lines.

The auxiliary "AND" gate A for the FIG. 3 system, is shown in FIG. 3–A. The three diodes $d_1$, $d_2$ and $d_3$ form the basic "AND" circuit. The $s$ channel inputs to the circuit are connected to the fourth terminal $s$, in series with resistor $R_3$, for the "AND" gate $A_3$. Each $s$ channel is applied similarly to the other "AND" gates, as aforesaid.

It is desirable from the standpoints of economy and system efficiency to minimize the number of shift registers, or delay lines, to be used. In accordance with the present invention, shifting of the time slot is realized with a minimum number of memory (delay) units, as will now be understood by those skilled in the art.

In will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described herein.

We claim:

1. In a multiplex communication system for a plurality of channels, a time division switching circuit comprising a plurality of time delay sections connected in cascade arrangement, an AND gate associated with each time delay section each having one terminal in common connection to the system multiplex line and an output terminal coupled to the input of its associated time delay section, means including circuit connections for impressing a source of successively generated pulses into each of said sections, and a control terminal at each AND gate for connection with a source of distribution control pulses to selectively close-circuit said AND gates for switching the successively generated pulses from said multiplex line in a predetermined distribution pattern along said sections to effect time delays in accordance with the number of sections through which the signals are conveyed, and to make the order of successively generated pulses at the output of said switch circuit different from that of the incoming pulses by passage through selected ones of said sections through which all information contained in one time slot is conveyed.

2. In a multiplex communication system for a plurality of channels, a time division switching circuit comprising a plurality of time delay sections connected in cascade arrangement, an AND gate associated with each time delay section each having one terminal in common connection to the system multiplex line, and an output terminal coupled to the input of its associated time delay section, means including circuit connections to each AND gate for impressing a source of successively generated pulses thereto, and a control terminal at each AND gate for connection with distribution control pulses to selectively close-circuit said AND gates and thereby switch the input signals from the multiplex line in a predetermined distribution pattern along said sections to effect a change in the order of the successively generated input pulses in accordance with the number of sections through which the signals pass wherein all pulses of one time slot pass through the same sections.

3. In a multiplex communication system as claimed in claim 2, in which said time delay sections are each a delay line.

4. In a multiplex communication system for a plurality of channels each with individual time slot division characteristics, a time division switching circuit comprising a plurality of digital-type time delay sections connected in cascade arrangement, an AND gate associated with each time delay section each having one terminal in common connection to the system multiplex line and an output terminal coupled to the input of its associated time delay section, means including circuit connections for impressing shift pulses to each of said sections, and a control terminal at each AND gate for connection with control pulses to selectively close-circuit said AND gates for switching the successively generated pulses from said multiplex line in a predetermined distribution pattern along said sections to effect time delays in accordance with the number of sections through which the signals are conveyed, and to make the order of successively generated pulses at the output of said switch circuit different from that of the incoming pulses by passage through selected ones of said sections through which all information contained in one time slot is conveyed.

5. In a multiplex communication system as claimed in claim 4, in which said time delay sections are each a shift register.

6. In a multiplex communication system for a plurality of channels each with individual time slot division characteristics, a time division switching circuit comprising a plurality of digital-type time delay sections connected in cascade arrangement, an AND gate associated with each time delay section each having one terminal in common connection to the system multiplex line and an output terminal coupled to the input of its associated time delay section, means including circuit connections to each time delay section for impressing shift pulses thereto, and a control terminal at each AND gate for connection with programmed control pulses for selectively close-circuiting said AND gates for switching the successively generated pulses from said multiplex line in a predetermined distribution pattern along said sections to effect time delays in accordance with the number of sections through which the signals are conveyed, and to make the order of successively generated pulses at the output of said switch circuit different from that of the incoming pulses by passage through selected ones of said sections through which all information contained in one time slot is conveyed.

7. In a multiplex communication system as claimed in claim 6, further including an OR gate coupling each AND gate to its associated section.

8. In a multiplex communication system as claimed in claim 6, a flip-flop circuit with a time delay network coupling the successive sections.

9. In a multiplex communication system as claimed in claim 8, further including an OR gate coupling each AND gate to its associated section.

References Cited by the Examiner

UNITED STATES PATENTS

| | | | |
|---|---|---|---|
| 2,596,989 | 5/52 | Deloraine | 179—15 |
| 2,641,698 | 6/53 | Gloess et al. | 179—15 |
| 3,024,444 | 3/62 | Barry | 340—168 |
| 3,056,112 | 9/62 | Lecher | 340—168 |
| 3,090,836 | 5/63 | Bezdel | 179—15 |

OTHER REFERENCES

Mathematics Dictionary, James and James, pp. 467–468, 1959, Van Nostrand.

STEPHEN W. CAPELLI, *Primary Examiner.*